United States Patent Office 3,453,244
Patented July 1, 1969

3,453,244
NOVEL ALIPHATIC-AROMATIC COPOLYAMIDES
Jack Preston, Raleigh, N.C., assignor to Monsanto
Company, St. Louis, Mo., a corporation of Delaware
No Drawing. Filed July 14, 1965, Ser. No. 472,009
Int. Cl. C08g 20/20
U.S. Cl. 260—78                                  10 Claims

ABSTRACT OF THE DISCLOSURE

Copolyamides containing alkylene and arylene radicals joined by amide linkages in an ordered arrangement are prepared by polymerization of diamines, having a central alkylene radical which is linked to amine terminated arylene radicals by carbonamide groups with diacid halides. These copolyamides retain the thermal resistance and high modulus of aromatic polymers and are melt spinnable to fiber as are aliphatic copolyamides.

---

This invention relates to copolyamides containing both aliphatic and aromatic linkages and, more particularly, to copolyamides which may be prepared from a preformed diamine intermediate having built-in alkylene and arylene linkages so that the resulting polymer will have alkylene and arylene radicals appearing in a regular, orderly fashion.

Thermally resistant polyamides have been developed for use in a wide variety of applications requiring prolonged resistance to heat and other degradative conditions. The factors which contribute to thermal and chemical resistance have also produced rigid polymers of high modulus and high glass transition temperatures which retain their physical properties well at elevated temperatures. Such temperature resistant polyamides are, for the most part, expensive to prepare and present difficulties in polymerization and in fabrication to shaped articles because of their insolubility and high melting point.

The polymers of this invention offer some of the best physical properties of aromatic polyamides, e.g., thermal resistance, high glass transition temperature, high modulus, and low elongation, yet retain the attractive and desirable feature of being, unlike the wholly aromatic polyamides, melt spun to fiber, as is the case with a non-aromatic, nylon 66.

An object of the present invention is the provision of copolyamides containing alkylene and arylene radicals joined by amide linkages in a regular, orderly fashion.

Another object of the invention is to provide copolyamides wherein a preformed intermediate contains both alkylene and arylene radicals.

Yet another object is to provide a method for the preparation of copolyamides containing alkylene and arylene linkages.

Still another object of this invention is to provide fibers, filaments, films and other shaped articles from the copolyamides of the invention.

Other objects and many of the attendant advantages of this invention will be readily appreciated as the same becomes better understood by reference to the following detailed description.

In general, these and other objects of the invention are accomplished by the provision of preformed intermediates having the general formula

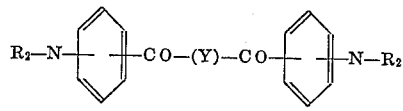

where the $NR_2$ may be oriented ortho, meta or para with respect to the CO, R is hydrogen or lower alkyl, and (Y) may be (1) 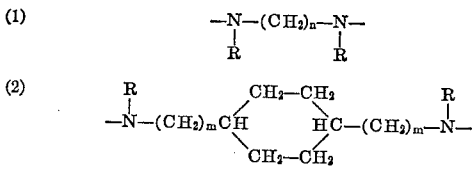

(2) 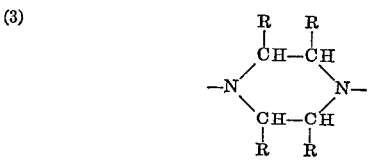

where $n$ is an integer of from 1 through 12 and $m$ is an integer of from 0 to 2, (3)

$$-N\begin{matrix}R&R\\ \diagup CH-CH \diagdown \\ \diagdown CH-CH \diagup \\ R&R\end{matrix}N-$$

where R is hydrogen or lower alkyl. Typical examples of diamines of this general formula include the following:

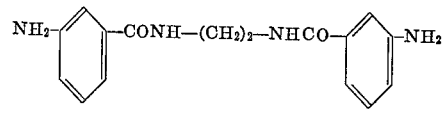

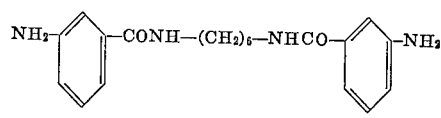

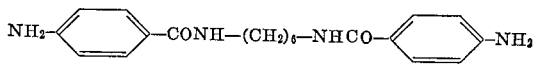

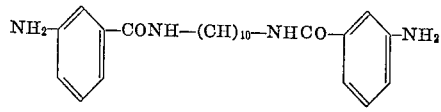

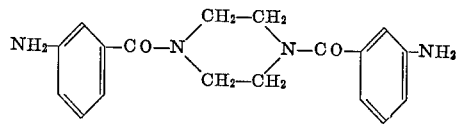

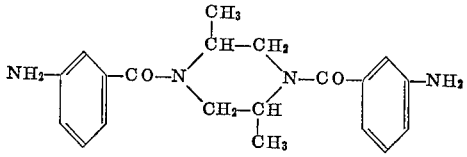

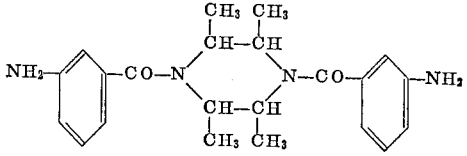

The preparation of the intermediates of the invention involves the condensation of an aromatic amino acid with a diamine of the aliphatic series. When the parent amino acid readily dicarboxylates, as does p-aminobenzoic acid, the acid ester may be used where the intermediate is prepared by heating the reactants. For thermally stable amino acids, such as m-aminobenzoic acid, a salt may be used which is thermally dehydrated to the desired intermediate. Piperazine and substituted piperazines and cyclohexane diamines may also be used to prepare the intermediates. A reaction for the preparation of the diamines may be illustrated as follows:

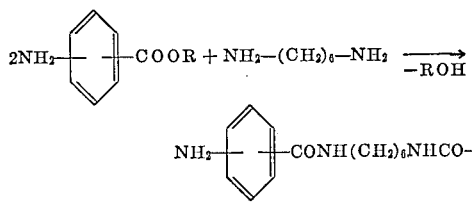

where $NH_2$ and $COOR$ may be oriented ortho, meta or para with respect to each other and R is hydrogen or lower alkyl.

The novel copolymeric compositions provided in accordance with this invention comprise recurring structural units of the general formula:

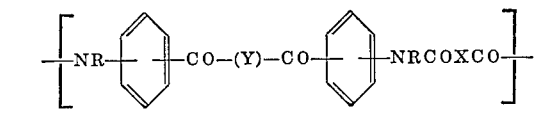

where —(Y)— is (1) 
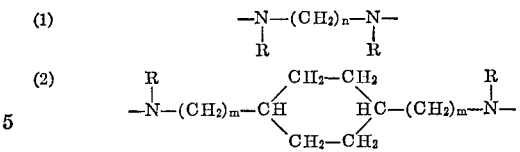

(2) 
$$-N-(CH_2)_m-CH \begin{matrix} CH_2-CH_2 \\ \\ CH_2-CH_2 \end{matrix} HC-(CH_2)_m-N-$$
 with R groups on N where $n$ is an integer of from 1 through 12 and $m$ is an integer from 0 through 2 or (3) 
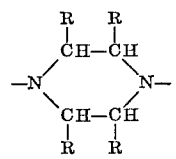

where R is hydrogen or lower alkyl in all occurences and X is a valence bond, or an alkylene or arylene radical of 6 to 12 carbon atoms. The polymers which come within this general formula include for example:

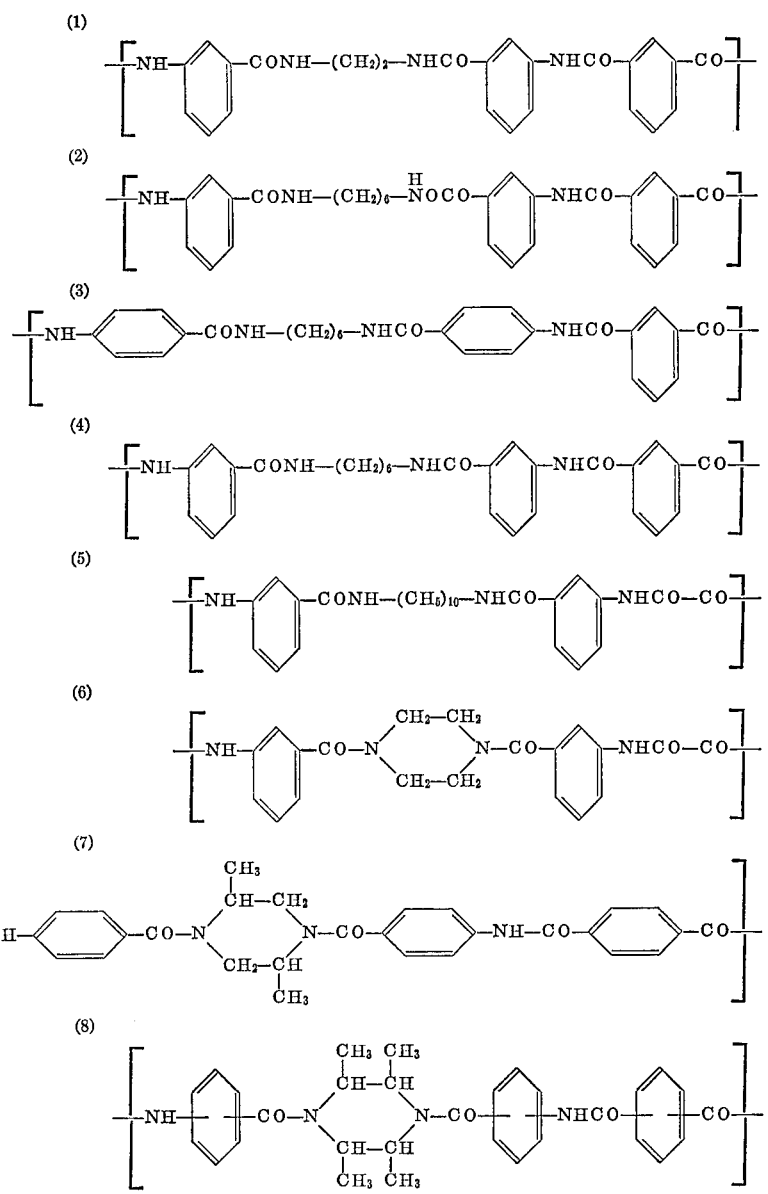

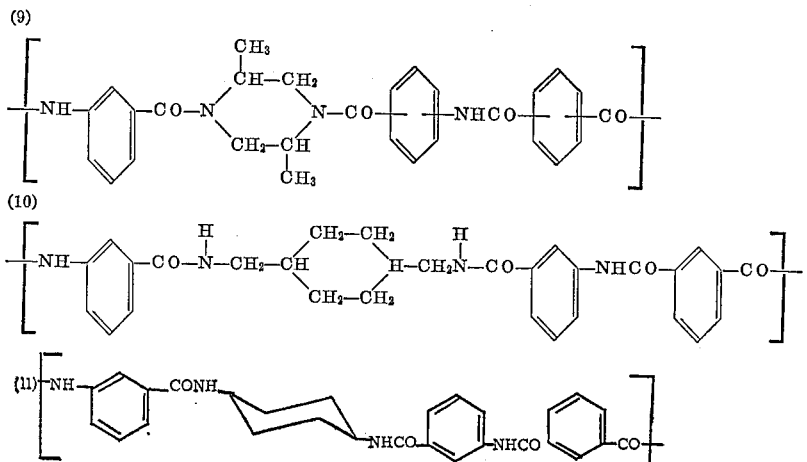

The preparation of the new copolymeric compositions of the invention involves a reaction which may be diagrammed as follows:

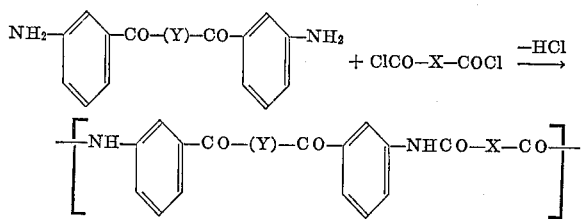

where X and (Y) are as previously indicated. For the preparation of these new copolyamides interfacial, solution, or dry-state polymerizations can be used.

The solution polymerization method involves dissolving the diamine in a suitable solvent which is inert to the polymerization reaction. The same solvents may be employed for both diamine and diacid. Among such solvents there may be mentioned dimethylacetamide, 1-methyl-2-pyrrolidone, 1,5-dimethyl-2-pyrrolidone, hexamethyl phosphoric triamide and the like. These solvents are rendered more effective in many instances by mixing them with a small amount, up to 10%, of an alkali or alkaline earth salt, such as lithium chloride, lithium bromide, magnesium bromide, magnesium chloride, beryllium chloride, or calcium chloride. The preferred solvent for solution polymerization is dimethylacetamide. The diamine solution is cooled to between 0° C. and —20° C. and the diacid chloride is added either as a solid or in a solution of one of the afore-mentioned solvents. The mixture is then stirred for a period of time until polymerization is substantially complete and a high viscosity is obtained. This highly viscous solution may be spun per se or the polymer may be isolated by pouring the mixture into a non-solvent, washing and drying the polymer and then preparing a spinning solution. Where an interfacial polymerization reaction is desired it is conducted by mixing water, an emulsifier and the diamine, preferably in the form of its dihydrochloride. A proton acceptor is then added and the mixture is stirred rapidly. During this rapid stirring the diacid halide, preferably in an inert organic solvent, is added. The mixture is stirred until polymerization is complete, with the polymer being isolated by filtration, followed by washing and drying. The diacid halide solvent may be any convenient one such as a cyclic non-aromatic oxygenated organic solvent such as cyclic tetramethylenesulfone, 2,4-dimethylcyclictetramethylenesulfone, tetrahydrofuran, propylene oxide and cyclohexanone. Further suitable diacid halide solvents include chlorinated hydrocarbons such as methylene chloride, chloroform and chlorobenzene, benzene, acetone, nitrobenzene, benzonitrile, acetophenone, acetonitrile, toluene and mixtures of these solvents such as tetrahydrofuran and benzonitrile, tetrahydrofuran and acetophenone, or benzene and acetone and the like.

The amounts of the various reactants which may be employed will of course vary according to the type of polymer desired; however, in most instances substantially equal molar quantities or a slight excess of diamine to diacid halide may be used. For interfacial polymerization reactions sufficient proton exceptor to keep the acidic by-products neutralized is added, the exact amount being easily determined by one skilled in the art.

Suitable emulsifying agents for interfacial polymerization include compounds such as sodium-laurylsulfate, nonyl(ethyleneoxide)ethythane, the sodium or potassium salt of any suitable condensed sulfonic acid and the like.

The proton acceptors which act as acid scavengers to neutralize HCl as formed during the reaction include sodium carbonate, magnesium carbonate, calcium carbonate, tertiary amines such as triethylamine, trimethylamine, tri tri-n-propyamine, ethyldimethylamine, tributylamine and similar compounds which react as desired.

The preparation of the diamines of the invention is further illustrated, but not limited, by Examples, I–III, showing the preparation of certain preferred diamine compositions.

EXAMPLE I

A solution prepared by mixing 13.7 grams (0.1 mole) of m-amino benzoic acid and 7.25 grams of 80% aqueous hexamethylene diamine (HMD) (0.05 mole), was poured into 500 ml. of ethanol. Crystals were obtained which had a melting point of 180° C.

A 50 ml. solution containing 12 grams of these salt crystals was decolorized with charcoal and evaporated to near dryness. Toluene was used to remove the last traces of water, and then the toluene was distilled and the dry salt was heated to 210° C., cooled slightly and heated under reduced pressure. The residue, a thick syrup, was refluxed with ethanol and filtered followed by a further purification effected by dissolving the product into dilute hydrochloric acid, filtering and reprecipitating the "diamine" by the addtion of base. The dried crude product had a melting point of 94–100° C.; the pure product recrystallized from ethanol had a melting point at 106–108° C.

*Analysis.*—Calc'd: N, 15.81. Found: N, 15.28; 15.14.

EXAMPLE II

Into a round bottom flask was charged 83 grams (0.5 mole) of ethyl p-aminobenzoate and 35 grams of 80% aqueous HMD (0.25 mole). Toluene was used to remove water; the toluene was distilled and the residue in the flask was heated to 190° C., then cooled and taken up in 300 ml. of ethanol producing a 10.7 gram yield of crystals which melted in the range of 180–190° C.

An additional sample of one-half the amount of the above compound was made and the residue taken up in ethanol and water as indicated above. A yield of 25 grams of N,N'-hexamethylenebis(p-aminobenzamide)

with a melting point of 180–185° C. was obtained. A recrystallization from alcohol-water gave 20 grams of product with a melting point of 188–190° C.

*Analysis.*—Calc'd: N, 15.81. Found: N, 15.75; 15.97.

The salt of p-aminobenzoic acid and HMD, prepared as in Example I, was heated slowly both in the dry state and in a high boiling hydrocarbon to 205° C. Very little product, with a melting point of 190–195° C., was obtained. Apparently the p-aminobenzoic acid decarboxylates before it dehydrates.

EXAMPLE III

A solution of 0.1 mole of piperazine and 0.2 mole of m-aminobenzoic acid in 200 ml. of water was poured into one liter of ethanol but no crystals formed. The solution was evaporated to dryness and the solid residue heated to 200° C. Next, the glassy solid obtained upon cooling the above residue was dissolved in 200 ml. of 1 N HCl. An oil precipitated when the preceding solution was made basic, but a solid was obtained by stirring the oil until it hardened. The product was stirred with water in a blendor jar, filtered and dried; a yield of 12.7 grams of product was obtained having a melting point of 225–240° C.

Diamines can be obtained by reduction of a dinitro intermediate; the preparation of some dinitro intermediates are descrbed in Examples IV and V.

EXAMPLE IV

The reaction of 0.025 mole of piperazine hydrate and 50 ml. of water with 0.025 ml. of m-nitrobenzoyl chloride in 20 ml. THF produced N,N'-piperzinebis(m-nitrobenzoamide). About 50 ml. of 1 N NaOH was added as an acid acceptor. The dried product had a melting point of 242–244° C., and was reduced with stannous chloride to give the diamine with a melting point of 240–242° C.

EXAMPLE V

In an interfacial procedure similar to that of Example IV there was produced, N,N'-ethylenebis m-(m-nitrobenzamide), melting point 224–231° C.; N,N'-hexamethylenebis(m-nitrobenzamide) melting point 200–202° C.; N,N'-2,5-dimethylpiperazine(m-nitrobenzamide) melting point 302–305° C.

These diamines are easily prepared from relatively inexpensive starting materials and are stable for long periods of time, making their use in the preparation of polyamides highly desirable.

The preparation of the copolyamides of the invention is illustrated by the following examples in which all parts and percents are by weight unless otherwise indicated.

EXAMPLE VI

A solution of 0.354 g. (0.001 mole) N,N'-hexamethylenebis(m-aminobenzamide) in 2 ml. dimethylacetamide (DMAc) was cooled to −30° C. and 0.203 g. (0.001 mole) isophthaloyl chloride was added. After 15 minutes the solution was allowed to warm to 0° C. and after an additional 15 minutes was allowed to warm to room temperature. Films were cast from the viscous solution, baked at 110° C. for 30 minutes, and 140° C. for 15 minutes. Fibers could be obtained by melting the film.

EXAMPLE VII

The solution polymerization of Example VI was repeated except that hexamethyl phosphoric triamide (HPT) was used as solvent and the diacid chloride was terephthaloyl chloride. Films and fibers were prepared as described above.

The polymer was also prepared via the interfacial polycondensation technique. A 3.54 g. (0.01 mole) sample of the diamine of Example VI was placed in a blendor jar with 75 ml. of water, 4.4 g. of sodium carbonate, and 0.3 g. sodium lauryl sulfate. The mixture was stirred to obtain a thick emulsion, then 25 ml. of tetrahydrofuran (THF) was added followed by a solution of 2.03 g. (0.01 mole) terephthaloyl chloride in 9 ml. THF and 17 ml. of benzonitrile. The emulsion was stirred rapidly for 15 minutes after which the resulting polymer was collected on a filter, washed with acetone, stirred in boiling water, filtered again, and dried at 50° C. in a vacuum oven.

The polymer, obtained in 4.4 g. yield, was soluble in DMAc containing 5 percent dissolved lithium chloride and a film was cast. A thick spinning solution was prepared from this polymer in concentrated sulfuric acid and film and fiber were prepared therefrom. A differential thermal analysis of the polymer showed a melting point of 360° C.

EXAMPLE VIII

The previously described solution polymerization technique was used to condense N,N'-hexamethylenebis(p-aminobenzamide) with isophthaloyl chloride in DMAc containing 5% dissolved lithium chloride. Films were prepared, washed in water to remove the dissolved salts, and dried at 140° C. in an oven for 15 minutes. The film can be drawn at 250°–275° C.; drawn film is opaque and very tough. A sample of this film showed an elongation of 3% whereas a nylon 66 sample under the same condition has 13%.

The interfacial polycondensation technique also was used to prepare the polymer of this example by employing chloroform as solvent for the isophthaloyl chloride.

EXAMPLE IX

A solution of 1.06 g. (0.003 mole) N,N'-hexamethylenebis(p-aminobenzamide) in 8 ml. of HPT and 1 ml. DMAc was polymerized with 0.609 g. (0.003 mole) terephthaloyl chloride at −30° C. Films were prepared which were dried at 140° C. for 2 hours; these films were white and opaque. Heating these films at 275–300° C. did not result in melting or even softening.

An interfacial polymerization was carried out using THF and benzonitrile as solvent for the terephthaloyl chloride. The dried polymer was soluble both in DMAc containing 5 percent dissolved lithium chloride and in concentrated sulfuric acid; films could be cast from solutions of the polymer in the respective solvents.

A differential thermal analysis of the polymer indicated that the melting point of the polymer was 475° C. In a capillary tube the polymer is perfectly white to 440° C. then turns a light yellow at 460° C. before decomposing. A thermogravamatric analysis of the sample indicated excellent ability to 400° C., then rapid loss of weight at about 450° C.

EXAMPLE X

A 3.54 gram (0.01 mole) sample of N,N'-hexamethylenebis(m-aminobenzamide) was placed in a blendor jar with 75 ml. of mater, 25 ml. of THF, 0.2 gram of sodium lauryl sulfate and 4.4 grams anhydrous sodium carbonate. A solution of 1.83 grams (0.01 mole) of adipyl chloride in 9 ml. of THF and 17 ml. of benzonitrile was added and the mixture was stirred rapidly for 15 minutes. The resulting polymer was collected on a filter, washed with acetone, then washed in hot water and dried. A yield of 2.0 grams of dry polymer was obtained which had a melting point of about 260° C., cold drawable fibers could be pulled from a melt of the polymer.

The temperature resistant copolyamides of this invention are relatively inexpensive to prepare when compared to most other wholly aromatic temperature resistant polyamides. They are soluble in a fairly wide range of solvents and the wide variation in melting points possible when using the various compositions of the invention renders them useful in a wide variety of applications. Melt spinning or solution spinning techniques may be used. The polymers of this invention will be useful in rigid structural materials such as laminates for aircraft, rockets, radomes, nose-cones and rocket engines, fluid applications requiring stability to higher temperatures such as various lubricants and hydraulic fluids, elastomers such as tires, hydraulic lines and seals, various fiber applications including tire-cord, parachutes, reinforcing for laminates, protective clothing, and other thermal insulation applications, coatings such as wire insulation and structural surfaces, dielectric applications such as used in various electronics systems and other uses requiring thermal stability, fluidity at low and high temperatures, tensile strength retained at elevated temperatures, shear and compression strength, abrasion resistance, elasticity, and radiation resistance. Other potential low elongation applications include conveyer belts, fire hose, flexible hose and ducting, sewing thread, and liquid filtration.

The foregoing detailed description has been given for clearness of understanding only, and unnecessary limitations are not to be construed therefrom. The invention is not to be limited to the exact details shown and described since obvious modifications will occur to those skilled in the art, and any departure from the description herein that conforms to the present invention is intended to be included within the scope of the claims.

I claim:

1. A linear fiber-forming copolymer consisting essentially of recurring structural units of the formula

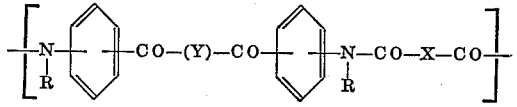

where Y is selected from (1)            −N−(CH$_2$)$_n$−N−
                        R             R (2) 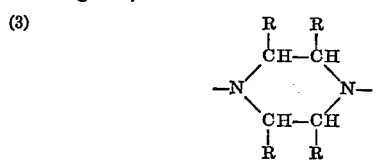

where $m$ is an integer of 0 to 2 and $n$ is an integer of from 1 through 12, and (3) 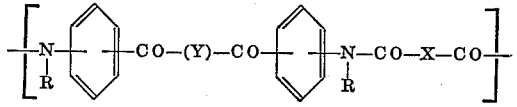

where R is hydrogen or lower alkyl and X is selected from an alkylene of 1 to 12 carbon atoms or an arylene of 6 to 12 carbon atoms.

2. A linear fiber-forming copolymer consisting essentially of recurring structural units of the formula

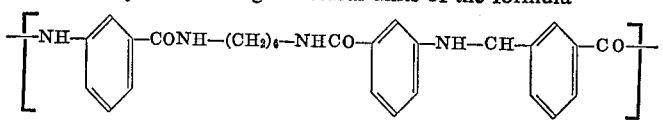

3. A linear fiber-forming copolymer consisting essentially of recurring structural units of the formula

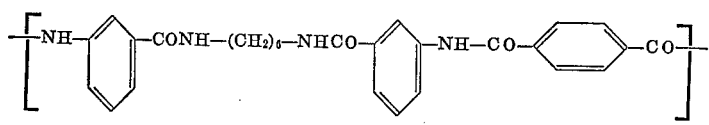

4. A linear fiber-forming copolymer consisting essentially of recurring structural units of the formula

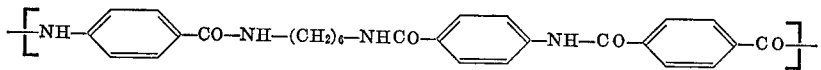

5. A linear fiber-forming copolymer consisting essentially of recurring structural units of the formula

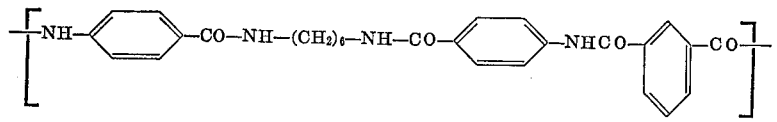

6. A linear fiber-forming copolymer consisting essentially of recurring structural units of the formula

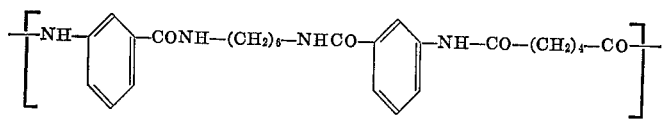

7. The copolymer of claim 1 in the form of a filament.
8. The copolymer of claim 1 in the form of a fiber.
9. The copolymer of claim 1 in the form of a film.
10. A linear fiber-forming copolymer consisting essentially of recurring structural units of the formula

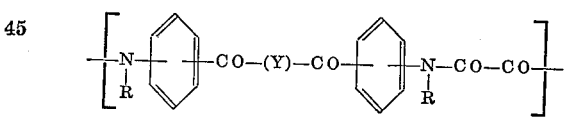

where Y is selected from (1)            −N−(CH$_2$)$_n$−N−
                        R             R (2) 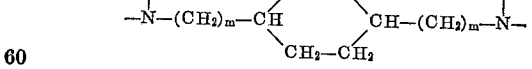

where $m$ is an integer of 0 to 2 and $n$ is an integer of from 1 through 12, and (3) 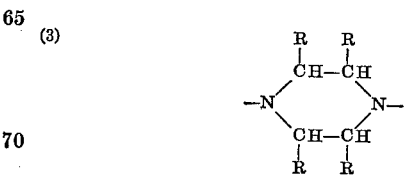

where R is hydrogen or lower alkyl.

(References on following page)

References Cited

UNITED STATES PATENTS

| | | | |
|---|---|---|---|
| 2,356,702 | 8/1944 | Schlack | 260—78 |
| 3,206,439 | 9/1965 | Detoro et al. | 260—78 |
| 3,232,910 | 2/1966 | Preston | 260—78 |
| 3,240,760 | 3/1966 | Preston et al. | 260—78 |
| 3,242,213 | 3/1966 | Preston | 260—78 |
| 3,296,213 | 1/1967 | Preston | 260—78 |

WILLIAM H. SHORT, *Primary Examiner.*

H. D. ANDERSON, *Assistant Examiner.*

U.S. Cl. X.R.

152—330; 260—30.6, 32.6, 33.8, 78